US012597320B2

(12) United States Patent
Huke et al.

(10) Patent No.: US 12,597,320 B2
(45) Date of Patent: *Apr. 7, 2026

(54) WAGER SHARING AND INVITATION METHOD

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US); Joseph Bodkin, Quincy, MA (US); Michael Baker, Georgie, VT (US)

(73) Assignee: AdrenalineIP, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,029

(22) Filed: Nov. 28, 2023

(65) Prior Publication Data

US 2024/0096179 A1 Mar. 21, 2024

Related U.S. Application Data

(63) Continuation of application No. 17/961,883, filed on Oct. 7, 2022, now Pat. No. 11,861,986, which is a continuation of application No. 17/086,803, filed on Nov. 2, 2020, now Pat. No. 11,468,744.

(60) Provisional application No. 63/085,389, filed on Sep. 30, 2020.

(51) Int. Cl.
*G07F 17/32* (2006.01)

(52) U.S. Cl.
CPC ...... *G07F 17/3274* (2013.01); *G07F 17/3288* (2013.01)

(58) Field of Classification Search
CPC .............................. G07F 17/327; G07F 17/328
See application file for complete search history.

(56) References Cited

U.S. PATENT DOCUMENTS

| | | | | |
|---|---|---|---|---|
| 8,734,231 | B2 * | 5/2014 | Shore | G07F 17/3241 463/40 |
| 9,218,716 | B2 * | 12/2015 | Barclay | G07F 17/3255 |
| 2008/0214303 | A1 | 9/2008 | Hamalainen et al. | |
| 2013/0095909 | A1 | 4/2013 | O'Dea | |
| 2013/0184062 | A1 | 7/2013 | Allen et al. | |
| 2017/0345256 | A1 * | 11/2017 | Cohen | G07F 17/3241 |
| 2019/0355210 | A1 | 11/2019 | Acres | |

OTHER PUBLICATIONS

Notification of Transmittal of the International Search Report and the Written Opinion of the International Searching Authority, or the Declaration issued on Oct. 21, 2021, in connection with corresponding International Application No. PCT/US2021/052527; 9 pages.

* cited by examiner

*Primary Examiner* — Thomas H Henry
(74) *Attorney, Agent, or Firm* — Maier & Maier, PLLC

(57) ABSTRACT

A method of sharing a wager on a live sporting event with another individual on a play by play wagering platform. Users can additionally invite other users to place the same wager or another wager on a different play. Upon accepting a wager invitation, the users additionally joining a chat conversation so as to communicate while placing wagers on the live sporting event.

9 Claims, 3 Drawing Sheets

| User ID | User's Name | Device ID | Account Balance | Contact User IDs |
|---|---|---|---|---|
| 00001 | Joe Smith | mob3984 | $ 385.00 | 00005, 06040, 01684, 12264 |
| 00002 | John Doe | dt34986 | $ 35.00 | 01351, 01686, 13245, 00130 |
| 00003 | Jim Rogers | dt325325 | $ 3,483.00 | 0001, 03456 |
| 00004 | Kelly Powers | mob352423 | $ 945.00 | |
| 00005 | Bob Jones | term45634 | $ 3,854.00 | 00001, 03543, 03547, 00020, 13245 |
| 00006 | Roger Huang | mob234534 | $ 245.00 | 16541, 06051, 00606, |
| 00007 | Issac Foster | mob22345 | $ 4,852.00 | 11650 |
| 00008 | Edwin Mcnally | dt54345 | $ - | |

WAGER SHARING AND INVITATION METHOD

FIELD

The embodiments are generally related to wagering on live sporting events, and specifically play by play wagering and the sharing of wagers.

BACKGROUND

Current sports betting platforms lack a way of driving user engagement and do not offer a way to encourage users to continue to place wagers through a live event.

A wagering platform can provide notifications of live events upon which an individual may place a wager, however it can be difficult to motivate a user to place wager, even if they are registered. However, a user who is either not watching a live event or may be watching but not placing wagers may not be sufficiently aware or engaged to make wagers.

Individuals wagering on a live sporting event will typically have a preference for a type of wager that they will accept, such as on whether a team in an American football game will run or throw, instead of wagering on whether the team will score on the next play. However, there is no current way to encourage these individuals to place wagers more frequently or place wagers on plays that they otherwise might not otherwise consider.

SUMMARY

Embodiments can include methods, systems, and apparatuses for making and sharing wagers on single plays in a live event in real time. One embodiment includes a method of sharing a wager placed by a first user on a single play inside of a live sporting event a wagering network; including receiving data from a live sporting event upon which wagers can be placed on plays inside of that live event, and placing a wager, by at least a first user, on a play in the live event, where the user shares the wager.

Another exemplary embodiment includes a system for placing and sharing wagers on a single play taking place during a live sporting event, including: a wagering network that facilitates wagering in real time on single plays taking place during a live sporting event; a wagering terminal that facilitates placing individual wagers, the wagering terminal communicatively coupled to the wagering network; a wager sharing module that is prompted by the placement of a first wager on the wagering terminal, the wager sharing module providing a list of contacts on the wagering terminal; and a notification sent to one or more contacts on the contact list from the wagering terminal.

Another embodiment includes a computer implemented method for placing and sharing wagers placed on a wagering network, including executing on a processor the steps of: displaying an interface of a wagering game for wagering in real time on single plays taking place during a live sporting event; displaying one or more wagering options; displaying a placed wager; displaying a list of contacts; and displaying a notification that a message has been sent to one or more contacts in the list of contacts, the notification related to the placed wager.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figures 1, 2:
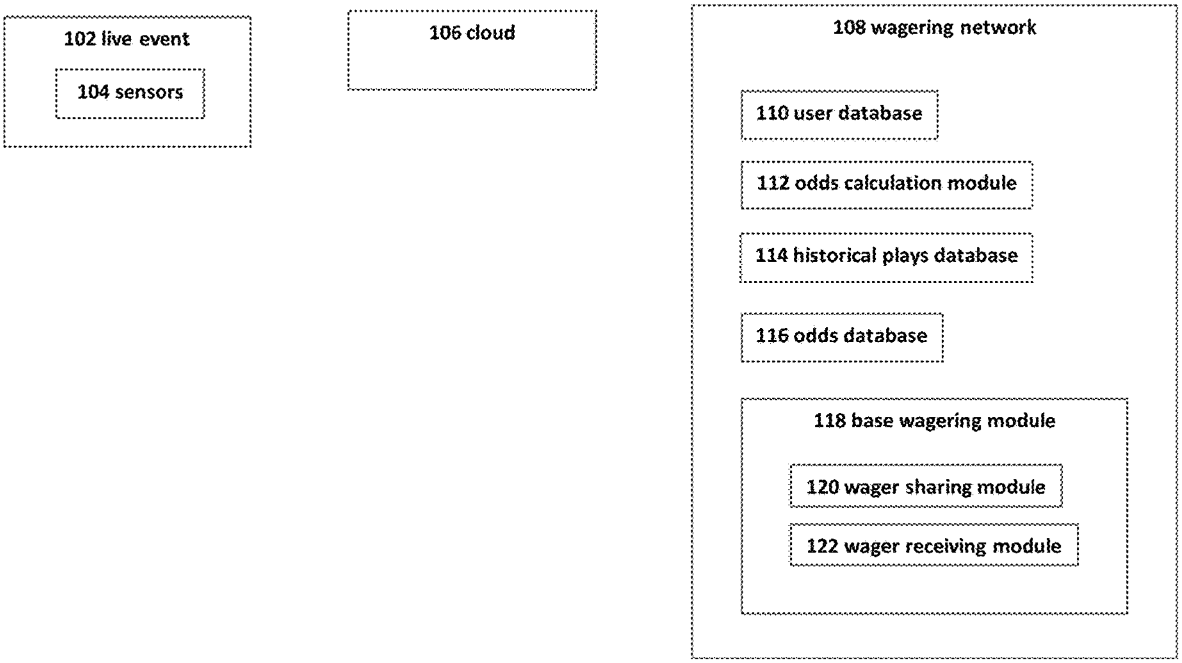
FIG. 1 illustrates a wager sharing and invitation method, according to an embodiment.
FIG. 2 illustrates a user database, according to an embodiment.

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for a wager sharing and invitations. The system may include a live event 102, for example a sporting event such as a football game, basketball game, baseball game, hockey game, tennis match, golf tournament, eSports or digital game, etc. The live event will include some number of actions or plays, upon which a user or bettor or customer can place a bet or wager, typically through an entity called a sportsbook. There are numerous types of wagers the bettor can make, including a straight bet, a money line bet, a bet with a point spread or line that bettor's team would need to cover, if the result of the game was the same as the point spread the user would not cover the spread, but instead the tie is called a push. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers, and prop bets that are added games, that often allow the user to customize their betting, by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event 102, such as the score of American football or the run line in baseball, or a series of action in the live event 102. Sportsbooks have a number of bets they can handle, a limit of wagers they can take on either side of a bet before they will move the line or odds off of the opening line. Additionally, there are circumstance, such as an injury to an important player such as a listed pitcher, in which a sportsbook, casino or racino will take an available wager off the board. As the line moves there becomes an opportunity for a bettor to bet on both sides at different point spreads in order to middle and win both bets. Sportsbooks will often offer bets on portions of games, such as first half bets and half-time bets. Additionally, the sportsbook can offer futures bets on live events 102 in the future. Sportsbooks need to offer payment processing services in order to cash out customers. This can be done at kiosks at the live event 102 or at another location.

Further, embodiments may include a plurality of sensors 104 that may be used such as motion sensors, temperature sensors, humidity sensors, cameras such as an RGB-D Camera which is a digital camera capturing color (RGB) and depth information for every pixel in an image, microphones, radiofrequency receiver, a thermal imager, a radar device, a lidar device, an ultrasound device, a speaker, wearable devices etc. Also, the plurality of sensors may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that captures statistical information through real-time X, Y positioning of players and X, Y, Z positioning of the ball.

Further, embodiments may include a cloud 106 or communication network which may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over Internet and relies on sharing of resources to achieve coherence and economies of scale, like a public utility, while third-party clouds enable organizations to focus on their core businesses instead of expending resources on computer infrastructure and maintenance. The cloud 106 may be communicatively coupled to wagering network 108 which may perform real time analysis on the type of play and the result of the play. The cloud 106 may also be synchronized with game situational data, such as the time of the game, the score, location on the field, weather conditions, and the like which may affect the choice of play utilized. For example, in other exemplary embodiments, the cloud may not receive data gathered from sensors and may, instead, receive data from an alternative data feed, such as SportsRadar®. This data may be provided substantially immediately following the completion of any play and the data from this feed may be compared with a variety of team data and league data based on a variety of elements, including down, possession, score, time, team, and so forth, as described in various exemplary embodiments herein.

Further, embodiments may include a wagering network 108 which may perform real time analysis on the type of play and the result of a play or action. The wagering network 108 (or cloud 106) may also be synchronized with game situational data, such as the time of the game, the score, location on the field, weather conditions, and the like which may affect the choice of play utilized. For example, in other exemplary embodiments, a wagering network 108 may not receive data gathered from sensors and may, instead, receive data from an alternative data feed, such as SportsRadar®. This data may be provided substantially immediately following the completion of any play and the data from this feed may be compared with a variety of team data and league data based on a variety of elements, including down, possession, score, time, team, and so forth, as described in various exemplary embodiments herein. The wagering network can offer a number of software as a service managed services such as, user interface service, risk management service, compliance, pricing and trading service, IT support of the technology platform, business applications, game configuration, state based integration, fantasy sports connection, integration to allow the joining of social media, as well as marketing support services that can deliver engaging promotions to the user.

Further, embodiments may utilize a user database 110 which contains data relevant to all users of the system, which may include a user ID, a device identifier, a paired device identifier, wagering history, and wallet information for each user. The user database may additionally include a table of contacts for each user which are user IDs for other users who have been added by a user. The table of contacts may also include other relevant information for communicating with the contacts such as their user IDs for other social network platforms, email addresses and phone numbers.

Further, embodiments may include an odds calculation module 112 which utilizes historical play data to calculate odds for in-play wagers.

Further, a historical plays database 114, that contains play data for the type of sport being played in a live event 102. For example, in American football, for optimal odds calculation, the historical play data should include meta data about the historical plays, such as time, location, weather, previous plays, opponent, physiological data, etc.

Further, embodiments may utilize an odds database 116 that contains the odds calculated by the odds calculation module, and the multipliers for distance and path deviation, and is used for reference by the base wagering module 118 and to take bets from the user through a user interface and calculate the payouts to the user.

Further, embodiments may include a base wagering module 118 that allows the user to place wagers on individual events in the live event 102. The user may make a traditional wager on the event, such as wagering that the next play in an American football game will be a run instead of a pass. In this example the user is getting 2/1 odds on the run, meaning that for every $100 they wager, they will receive $200 if they win. The base wagering module 118 can also allow users to share their wager with other users. The wager sharing module 120 is called when a wager is place and may also be called upon a user winning a wager allowing the user to share their wager with a second user and invite the second user to place a wager on the same play and join a chat conversation with the user. The invitation receiving module 122 is called when the base wagering module 118 receives a message from the wagering network 108 allowing the user to accept the invitation and place a wager on the same play as the user who sent the invitation and also join a chat conversation with the user who sent the invitation. Upon completion of a play, the base wagering module 118 determines the result of wager and adjusts the balance of the user's account in the user database 110 base upon the result of the wager.

Further, embodiments may include a wager sharing module 120 that is prompted by the base wagering module 118 when a user places a wager, providing to the user a list of contacts stored in the user database 110 and allowing the user to select one or more contacts to invite to either make the same bet on the same play or to join a live synchronous or asynchronous messaging session to communicate and place future wagers during the live event 102. The wager sharing module 120 further receiving notification that the user the invited contact has elected to make the same bet and/or join the messaging session for the duration of part or all of the remainder of the live event 102, or alternatively that the invitation has been rejected or timed out.

Further, embodiments may include an invitation receiving module 122 that may be prompted by the base wagering module 118 when the base wagering module 118, upon polling a wagering network 108 for received messages, receives a message from the wagering network 108. The message can include at least an invitation to place a wager on the same play and additionally an invitation to join a chat conversation with the user who sent the invitation.

FIG. 2 illustrates the user database 110. The user database 110 stores data relevant to users of a wagering platform and may include any of a user ID, user's name, a device identifier, a wagering history and an account of funds for wagering. The user database 110 may additionally contain contacts for each user such as in the form of user IDs for individuals whom the user has indicated to be acquaintances. The user database 110 is used by the wager sharing module 120 for selecting from the contacts in the user database 110 with whom to share a wager invite. In an embodiment, the wager sharing module 120 querying the user database 110 to retrieve a list of contact user IDs associated with user Bob Jones, including the user ID for user Joe Smith, who user Bob Jones selects to receive a wager invitation. The user database 110 is further used by the base wagering module 118 to update the user's account of funds for wagering.

Figure 3:
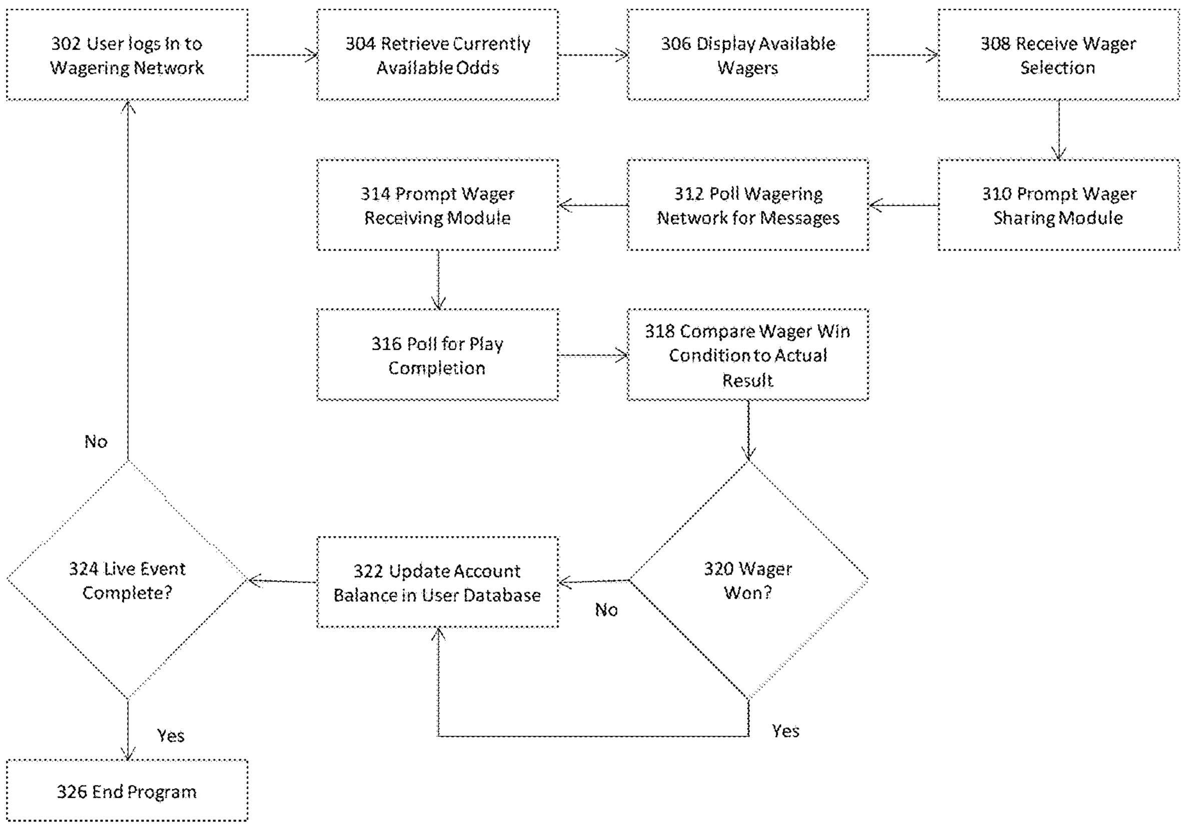
FIG. 3 illustrates a base wagering module, according to an embodiment.

FIG. 3 illustrates the base wagering module 118. The process begins with a user logging into the wagering network 108 at step 302 via a user interface by entering a username and a password. In an embodiment, the username is an email address and the password are a combination of alphanumeric characters. Current odds are retrieved at step 304 for available wagers from an odds database 116. Available wagers are displayed at step 306 to a user via a wagering terminal. A wagering terminal may be any of a mobile device, notebook or desktop computer, or a proprietary computing device. A wagering terminal may further be any computing device with an internet connection. The available wagers, including a win condition, such as the offensive team in a football game completing a pass for a first down, and odds, such as 5/1, can be selected by a user. A wager is received from a user at step 308 via a wagering terminal. The wager includes a wager amount such as $50, a win condition upon which a payout is made according to the odds, and odds, such as 5/1, in which case the user Bob Jones will receive a payout of five times their wager if the win condition is met during the play. At step 310, the wager sharing module 120 is prompted. The wager sharing module 120 displays contacts from the user database 110 and receives a selection of at least one contact from a user. The wager sharing module 120 sends an invitation to the contact to place a wager and join a chat conversation via the play by play wagering platform and waits for a response. Upon receiving a response that the invitation was accepted, the wager sharing module 120 initiates a chat conversation between the user and the contact and returning to the base wagering module 118. Polling, at step 312, is done to the wagering network 108 for a message sent by another user. Prompting, at step 314, is performed by the wager receiving module 122 if a message is received from the wagering network 108. The wager receiving module 122 polls the wagering network for messages and receiving a wager invitation from a second user. The received wager invitation is displayed to the first user and a wager selection is received from the first user. Further, sending a notification that the invitation was accepted by the first user and initiating a chat conversation between the first and second user via the play by play wagering platform and returning to the base wagering module 118 may be performed. Next, at step 316 the sensors 104 may be polled for the completion of the play wagered upon by the user. In an embodiment, play completion may be signified by detection of a whistle blown by a referee in an American football game. Alternatively, play completion may be indicated by the ball returning to the hands of a pitcher and the pitcher returning to the pitching mound in a baseball game. Comparing, at step 318, the wager win condition to the actual result of the play by polling the sensors 104. In an embodiment, the wager win condition may be an American football team completing a pass for a first down and the actual result may be an American football team running for a gain of three yards. Determining, at step 320, whether the wager was won. The wager is won if the actual result of the live event matches the win condition associated with the wager. In an embodiment the win condition may be an American football team completing a pass for a first down and the wager is won if the actual result includes a completed pass and a gain sufficient to advance the line of scrimmage past the first down line. If the wager is won, the base wagering module 118 may further prompt the wager sharing module 120 to invite another user to join future bets during the live event 102 and a chat conversation. Updating the account balance of the user at step 322 in the user database 110 based on the result of the wager. If the wager is won, then increasing the account balance in an amount equal to the payout. The payout is determined based upon the odds accepted when the user placed the wager. In an embodiment, the odds are 5/1 and the wager amount is $50, so the payout would be $250. If the wager amount was not debited from the account balance prior to play completion, then adjusting the account balance by the difference between the wager amount and the payout. Similarly, if the wager was lost and the wager amount was not previously debited from the account balance, reducing the account balance by the wager amount. Polling the live event 102 for event at step 324 completion. The live event 102 may be complete if a video feed is terminated or alternatively if the sensors 104 detect a succession of whistle sounds from a referee in an American football game signaling the end of a game. If the event is not complete, return to step 304. Ending the program at step 328 if the live event 102 is complete.

Figure 4:
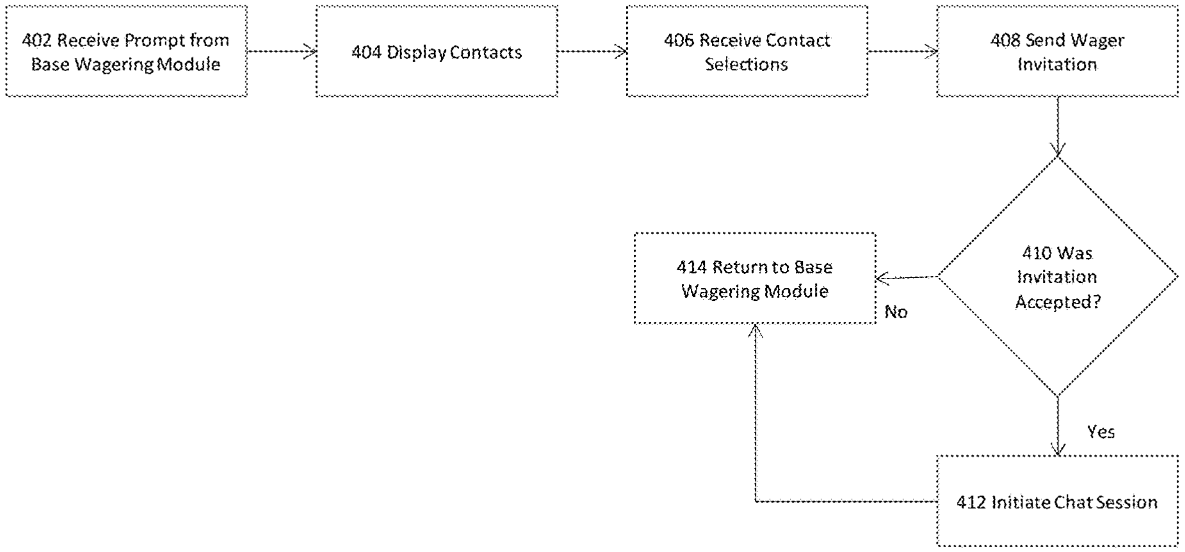
FIG. 4 illustrates a wager sharing module, according to an embodiment.

FIG. 4 illustrates the wager sharing module 120. The process begins with receiving a prompt, at step 402, from the base wagering module 118 that the user has placed a wager. The wager includes a wager amount, a win condition and odds. In an embodiment, the wager amount is $50, the win condition is an American football team completing a pass for a first down and the odds are 5/1. Alternatively, wager sharing module 120 can include receiving a prompt from the base wagering module 118 that the user has won a wager. Querying the user database 110 may be done at step 404 to determine contacts associated with the user and displaying the contacts to the user. Each contact may include a name and a profile picture. The contact may additionally include wagering history, such as the total number of wagers the individual has placed on the play by play wagering platform and total amount of money won on previous wagers as well as the contacts times zone or current availability, such as whether the contact is currently online on the platform or offline. Receiving a selection, at step 406, of one or more contacts from the user may be performed. Sending a wager invitation, at step 408, to the selected one or more contacts may also be performed. The wager invitation can include details of the wager placed by the user including the win conditions and odds. The wager invitation may additionally include the wager amount. The wager invitation prompts the one or more contacts to place a wager on the play and further join a chat conversation with the user who selected the contact to receive an invitation. In an embodiment, the invitation prompts the contact, user Joes Smith, to wager on the same play as the user Bob Jones. Polling of the wagering network 108, may be done at step 410, for a message confirming that a contact accepted the invitation. The confirmation message may include details of a wager placed by the contact. If the received message alternatively declined the invitation, the wager sharing module 120 may be exited and could be returned to the base wagering module 118. If the invitation was accepted, initiating a chat session at step 412, between the user Bob Jones and the contact from whom a message accepting the invitation was received, user Joe Smith, may be performed. The chat session may be any of a voice, video or text chat. In an embodiment, the chat session is a voice chat session. Returning, at step 414, to the base wagering module 118.

Figure 5:
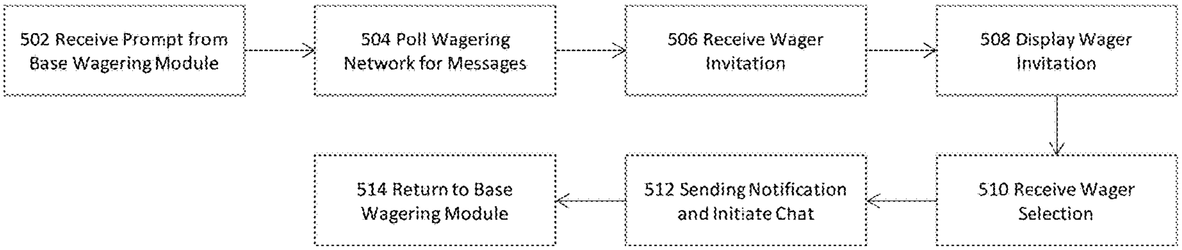
FIG. 5 illustrates a wager receiving module, according to an embodiment.

FIG. 5 illustrates the wager receiving module 122. The process begins with receiving a prompt at step 502 from the base wagering module 118 that the base wagering module 118 received a message from the wagering network 108. Polling the wagering network 108 can be next, at step 504, to check for messages. The messages may include an invitation to place a wager or join a chat conversation. Receiving a wager invitation may be done at step 506, including an invitation to place a wager on the same play as another user's wager and an invitation to join a chat conversation with the other user. In an alternate embodiment, the invitation may include the successful results of another user's wager and an invitation to place a wager on a future play in the live event 102. The wager invitation may be displayed, at step 508, to the user. The invitation further prompts the user Joe Smith to place a wager and join a chat conversation. In an embodiment, the wager includes a win condition that an American football team will complete a pass for a first down, and odds of 5/1. Further, the chat conversation invite may prompt for any of a text, voice or video conversation. A wager selection may be received, at step 510, from a user. The wager selection includes acceptance of a win condition, odds, and a wager amount. In an embodiment, the win condition is an American football team completing a pass for a first down with odds of 5/1, and a wager amount of $100 such that the payout from the wager will be $500 if the win condition occurs. The user Joe Smith may alternatively decline the wager selection by rejecting the invitation or allowing the invitation to timeout. Sending, at step 512, a notification to and initiating a chat conversation with the user Bob Jones who originated the wager invitation may then occur. The chat conversation may be any of a text, voice or video conversation. Returning, at step 514, to the base wagering module 118, may then be done.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method comprising:

receiving data from an event, wherein wagers can be placed on actions or results of the event;

determining odds for wagering on an action or result of the event;

placing a wager on a closed network, by at least a first user, on the action or result of the event, wherein the closed network is accessed, for each user, by authenticating each user;

displaying network contacts of the first user from a user database on the closed network, wherein the first user is prompted to select at least one contact;

sending, to the selected at least one contact on the closed network, a message related to the action or result upon which the first user placed the wager, wherein the message is sent from the first user to the at least one contact inside the closed network;

displaying the message for a similar wager to the at least one contact; and prompting a response from the at least one first contact when the at least one contact places a wager from the message.

2. The method of claim 1, further comprising:

sending a message to the first user that the selected at least one contact has placed the similar wager.

3. The method of claim 1, further comprising:

sending, to the selected at least one contact, a request to join a live synchronous or asynchronous messaging session with the first user.

4. The method of claim 1, further comprising, before prompting a response from the at least one first contact when the at least one contact places a wager from the message:

determining that the at least one first contact has placed a wager on the closed network.

5. The method of claim 4, wherein determining that the at least one first contact has placed a wager is done by polling the closed network.

6. The method of claim 1, wherein the message related to the action or result upon which the first user placed the wager is an invitation to place a wager.

7. The method of claim 1, wherein the message contains at least one of win conditions, odds, and a wager amount.

8. The method of claim 1, wherein the message contains at least one of results of the placed wager by the first user and an invitation to the at least one contact to place a wager on a future action.

9. The method of claim 1, wherein the closed network is configured to perform real time analysis on a type of play and a result of the play.

* * * * *